United States Patent Office 3,459,919
Patented Aug. 5, 1969

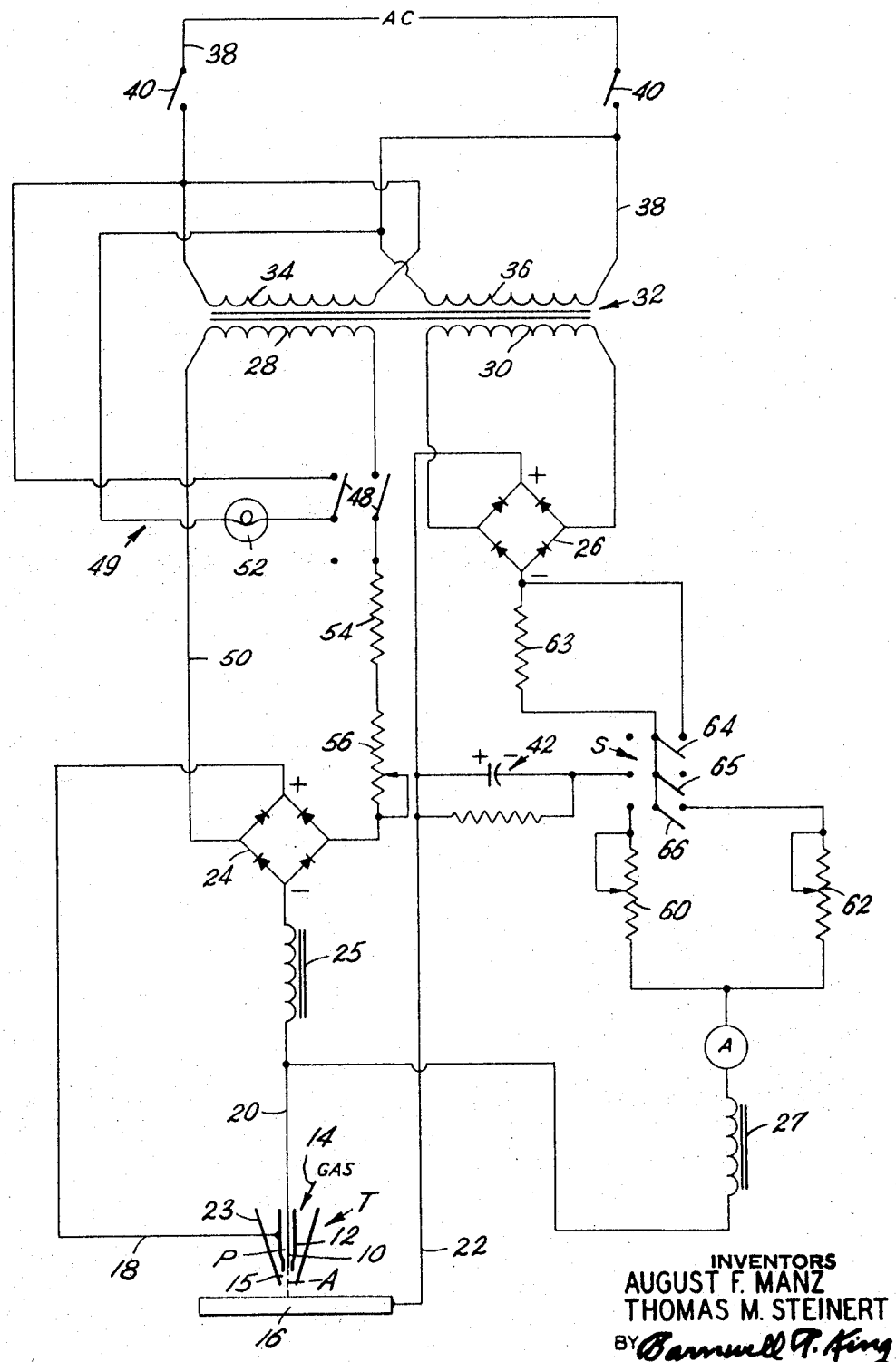

3,459,919
MULTIARC TORCH ENERGIZING METHOD
AND APPARATUS
August F. Manz, Union, and Thomas M. Steinert, West
Orange, N.J., assignors to Union Carbide Corporation,
a corporation of New York
Filed Apr. 19, 1966, Ser. No. 543,746
Int. Cl. B23k 9/10
U.S. Cl. 219—131                    7 Claims

ABSTRACT OF THE DISCLOSURE

A power supply system for a combined gas-shielded transferred and non-transferred arc welding system includes a current responsive switch. A means is provided for supplying individual currents to each of the arcs which operates in combination with the switch to adjust the current supplied to one of the arcs. At the same time, the switch operates to inversely adjust the current supplied to the other arc for the combined purpose of reducing objectionable heating of the torch upon an increase in current and for sustaining the arc upon a decrease in current.

---

This invention relates to work-in-circuit arc working, and more particularly to the energization of gas shielded plasma arc torches of the type in which a transferred arc is combined with a non-transferred pilot arc.

The invention provides a novel method of continuously supplying currents to a transferred arc and to a non-transferred or pilot arc in a gas-shielded arc torch, which comprises automatically and simultaneously inversely changing current supplied to one of such arcs when the current supplied to the other one of such arcs changes, to minimize objectionable heating of the torch when the transferred arc current increases, as well as to maintain operation of such arc when such current decreases.

The system comprises a power supply system for plasma arc torches of the combined gas-shielded transferred and non-transferred arc type, comprising the combination of means for continuously supplying individual currents to each of such arcs, means for changing to adjust the current supplied to one of such arcs, and means acting automatically and simultaneously inversely to change the current supplied to the other one of such arcs, to minimize objectionable heating of the torch when the transferred arc current increases, as well as to maintain operation of such arc when such current decreases.

The main object of the invention is to provide for the simple and economical energization of small needle-like plasma arc torches, which results in maximum utilization of the transferred arc as well as of the non-transferred or pilot arc without damaging the torch.

In the drawing, the single figure is a circuit diagram illustrating the invention.

Referring to the drawing, needle plasma arc torch T is provided with a needle-like electrode 10 the lower end of which is located centrally within a copper nozzle 12. Such lower end of the electrode 10 is positioned behind a constructed orifice in such nozzle 12 so that a stream of inert gas 14, such as argon, flows downwardly around such end, protecting the latter, out of the orifice in the nozzle 12 and over the surface of work 16 positioned under the torch. A continuous non-transferred pilot arc P is energized in the nozzle 12 between the latter and the electrode 10, by direct current supplied through leads 18 and 20. Similarly, a continuous transferred needle-like work arc A is energized between the end of the electrode 10 and the work 16, by direct current supplied through leads 18 and 22. The entire plasma needle arc output of the nozzle 12 is protected from the atmosphere by an annular stream 15 of protective gas such as argon which is discharged by a ceramic cup 23.

The pilot arc P and the work arc A are supplied with individual currents by a novel circuit that includes rectifiers 24 and 26 that are connected to secondary windings 28 and 30, respectively, of transformer 32, the primary windings 34 and 36 of which are connected to an A.C. source by leads 38, 38 containing switches 40, 40. Closure of the latter applies 115 volts A.C., for example, to the primary of transformer 32. The output of rectifier 24 is provided with a choke-filter circuit 25; and rectifier 26 with a choke-filter circuit 27.

The transformer 32 is a high leakage reactance type providing a controlled interaction between the main arc and pilot arc output windings. The interaction causes the pilot arc current to decrease as the main arc current is increased. Secondary one (1) is the main current winding 30 and is capable of providing 10 amps at 40 volts D.C. when it is connected to the single phase full-wage bridge rectifier 26. Secondary two (2) is the pilot arc winding 28 and is capable of providing 5 amps at with at least 20 volts D.C. when connected to the single phase full-wave bridge rectifier 24.

When the two outputs (main arc and pilot arc) are used simultaneously, the interaction causes each to be lowered slightly. Since the needle arc torch T is set to maintain a constant pilot arc geometry, the pilot arc current can be adjusted initially to any current value, up to and including 5 amps. This adjustment should be made with the main arc off. When the main arc is energized, depending on its amount of current, the pilot arc current decreases.

The decrease is automatic. The net effect is to lower the heat load on the torch due to the pilot arc and allow the main arc to be operated at a higher level than would be permissible were the pilot arc current to remain at its initial valve. Therefore, the total heat load on the torch for a 10 amp main arc is less than it would be if the pilot arc main arc interaction were not present.

The open circuit voltage of the main arc power circuit is increased by use of an RC filter unit 42. Normally, capacitor filtering requires the use of rectifiers of increased cost and rating. However, when the RC filter unit is added only where the transformer-rectifier output has been reduced, as it is in this circuit, then the peak rectifier currents due to the capacitor filtering are limited to values within the normal inductance filtered rating. In this manner, an increased open circuit voltage is obtained at no increase in rectifier cost. Removal of the RC section reduces the open circuit voltage to about 70–75 volts D.C. The reduction of the open circuit voltage at increased output minimizes the cost of providing the main arc current in several ways. First, the wattage rating of the required current adjusting resistors is decreased. Second, the transformer capacity need not be as great as when RC filtering is used. Third, the heat loss inside the cabinet is less. Fourth, the power drawn from the input line is less. Fifth, the rectifier need not be as large.

Because of the high leakage reactance of the transformer, it is sensitive to location near magnetic materials—such as the walls, etc., of the cabinet. Once the cabinet layout is determined, the transformer location must be maintained. The greater the coupling of the transformer field with surrounding magnetic materials, the greater is the loss of flux to the main arc windings and the greater is the "droop" of the output. In fact, this feature of more output droop may be used to advantage in limiting the maximum output without the use of series connected resistance.

Closing double-pole single-throw switch 48 results in energization of circuit 49 including transformer primary windings 34 and 36, supplying 115 volts A.C. to pilot light 52, as well as the energization of pilot arc circuit 50. The circuit 50 contains a fixed resistor 54 and an adjustable resistor 56 for setting the pilot arc current value according to the size of the torch T, about 4–5 amperes, for example.

The main needle arc current is set by adjusting one of the resistors 60, 62 in circuit 26, from about 0.1 ampere to 10 amperes, for example, at 40 volts. Pole 64 of triple-pole double-throw switch S bypasses resistor 63 under high arc current conditions, so that adjustable resistor 62 is the only one in the circuit, fixed resistor 63 being shunt circuited thereby. Under low arc current conditions resistors 63 and 60 are in series, and the RC circuit 42 is connected across leads 20 and 22 by poles 65 and 66 of switch S.

Thus, when the pilot arc circuit current is at a maximum value, the work arc circuit current is at a minimum, and vice versa, one going up as the other goes down—so that the pilot arc current is inverse to the needle arc current, maintaining a minimum heat load on the torch and providing greater pilot arc function at low needle arc currents, resulting in greater needle arc stability. At high needle arc currents, the high pilot arc current is not needed—so the current is reduced.

In operation the non-transferred arc plasma is discharged in the shape of a needle from the torch T toward the work 16. When the main arc current is flowing, the transferred arc plasma is also in the shape of a needle. The invention is highly suitable for welding thin gage materials including stainless steels and other alloys.

The following table illustrates typical current/voltage operating data of the invention for a 10 ampere size transferred arc torch.

|  | Low range |  | High range |  |  |
|---|---|---|---|---|---|
| Trans arc: |  |  |  |  |  |
| Current | 0 | 0.12 | 2 | 2.1 | 10 |
| Voltage | 0 | 25 | 27.5 | 27 | 28 |
| Pilot arc: |  |  |  |  |  |
| Current | 5.39 | 5.25 | 5.3 | 5.1 | 4.2 |
| Voltage | 15.4 | 14.9 | 13 | 12 | 9.6 |
| Open circuit voltage: |  |  |  |  |  |
| Trans arc |  | 125 |  | 73 |  |
| Pilot arc |  | 57 |  | 57 |  |

What is claimed is:

1. Method of continuously supplying currents to a transferred and to a non-transferred arc from a variable current power supply in a gas-shielded arc torch, which comprises automatically and simultaneously inversely changing current supplied to one of such arcs when the current supplied to the other one of such arcs changes in response to a current change in the power supply to minimize objectionable heating of the torch when the transferred arc current increases, as well as to maintain operation of such arc when such current decreases.

2. Method as defined by claim 1, in which the stability of the transferred arc is maintained by increasing the open-circuit voltage supplied thereto from otherwise self-extinguishing values at low current levels.

3. Method as defined by claim 1, in which the non-transferred arc acts as a pilot arc to the transferred arc which acts on work in circuit with such transferred arc.

4. A variable current power supply system for arc torches of the combined gas-shielded transferred and non-transferred arc type, comprising the combination of means for continuously supplying individual currents to each of such arcs, means for changing the magnitude of current supplied from the variable current supply such that the current supplied to one of such arcs is varied, and means acting automatically and simultaneously inversely to change the current supplied to the other one of such arcs, to minimize objectionable heating of the torch when the transferred arc current increases, as well as to maintain operation of such arc when such current decreases.

5. A power supply system as defined by claim 4, in which said automatic current changing means comprises a transformer having a core provided with a preselected flux leakage characteristic, a primary winding on said core connected to an A.C. source, and two secondary windings on said core spaced from said primary winding so that the flux leakage characteristic changes with a change in the current of either one of said secondary windings, whereby, the current in the other secondary winding changes inversely, and rectifier-choke filter circuits connected to said secondary windings, load circuits connecting said rectifiers so as to supply direct currents to such arcs, and circuit means for adjusting the direct current supplied to one of such arcs.

6. A power supply system as defined by claim 5, in which means are provided for maintaining the stability of the transferred arc by increasing the open-circuit voltage, thereof, from otherwise self-extinguishing values at low current levels.

7. A power supply system as defined by claim 6, in which said transferred arc stability maintaining means comprises a resistor-capacitor circuit, and a switch for connecting the latter across the D.C. side of the corresponding rectifier.

References Cited
UNITED STATES PATENTS 2,806,124   9/1957   Gage _____ 219—130 X
2,982,845   5/1961   Yemni et al. _____ 219—75 X ANTHONY BARTIS, Primary Examiner J. C. SMITH, Assistant Examiner U.S. Cl. X.R.
219—74

UNITED STATES PATENT OFFICE
CERTIFICATE OF CORRECTION

Patent No. 3,459,919                                                                     August 5, 1969

August F. Manz et al.

It is certified that error appears in the above identified patent and that said Letters Patent are hereby corrected as shown below:

In the drawing, amend the drawing to remove the short in the primary winding.

Signed and sealed this 29th day of September 1970.

(SEAL)
Attest:

Edward M. Fletcher, Jr.                                         WILLIAM E. SCHUYLER, JR.
Attesting Officer                                                           Commissioner of Patents